United States Patent [19]

Gines

[11] Patent Number: 6,070,899
[45] Date of Patent: Jun. 6, 2000

[54] SELF-RETRACTING CART FOR USE IN THE CARGO BAY OF A SPORT UTILITY VEHICLE

[76] Inventor: Roberto Gines, 655 Ives Dairy Rd., Apt. 404, North Miami, Fla. 33179

[21] Appl. No.: 09/085,578

[22] Filed: May 28, 1998

[51] Int. Cl.[7] .................................................. B62B 3/02
[52] U.S. Cl. .................. 280/651; 280/641; 280/652; 280/655; 280/43.1; 280/640; 296/20
[58] Field of Search ..................... 280/43.1, 651, 280/40, 652, 655, 47.131, 640, 641, 47.36, 47.371; 296/20; 248/129; 16/900, 436, 430

[56] References Cited

U.S. PATENT DOCUMENTS

| | | | |
|---|---|---|---|
| 1,278,618 | 6/1918 | Eikenberry | 256/11 |
| 1,785,646 | 12/1930 | Pascoo | 280/86.753 |
| 2,199,518 | 5/1940 | Coleman | 256/11 |
| 2,565,820 | 8/1951 | Machanic | 280/38 |
| 2,718,405 | 9/1955 | Casey | 280/43.1 |
| 2,877,047 | 3/1959 | Weil | 280/641 |
| 3,223,429 | 12/1965 | Hastings | 280/641 |
| 3,305,243 | 2/1967 | Manfredi, Jr. et al. | 280/651 |
| 3,669,031 | 6/1972 | Cole | 108/12 |
| 3,716,279 | 2/1973 | Anderson et al. | 312/349 |
| 4,192,541 | 3/1980 | Ferneau | 280/640 |
| 4,275,896 | 6/1981 | Eicher | 280/43.1 |
| 4,989,889 | 2/1991 | Server Perez | 280/40 |
| 5,645,541 | 7/1997 | Cheng | 280/642 |
| 5,649,718 | 7/1997 | Groglio | 280/641 |
| 5,687,984 | 11/1997 | Samuel | 280/641 |

*Primary Examiner*—Michael Mar
*Assistant Examiner*—Hau Phan
*Attorney, Agent, or Firm*—Richard L. Miller, P.E Registered Patent Agent

[57] ABSTRACT

A self-retracting cart for use in the cargo bay of a sport utility vehicle. When a pair of front wheels are caused to roll on and into the cargo bay by the self-retracting cart for use in the cargo bay of a sport utility vehicle being pushed therein, a push plate is caused to press against the rear edge of the cargo bay and traverse rearwardly causing a pair of arms to traverse rearwardly and cause a pair of spreader brackets to fold which causes a pair of front struts to pivot upwardly against a bottom wall of the basket and retract a pair of intermediate wheels against the pair of side walls of the basket and out of the way and thereby retracting the front wheel assembly. When a pair of rear wheels leave the ground by the self-retracting cart for use in the cargo bay of a sport utility vehicle being further pushed into the cargo bay, a pair of rear struts drop and cause elongated slots to bottom out on a pair of roller pins which causes the uppermost ends of the pair of rear struts to clear a pair of limit pins, which allows the pair of rear struts to pivot upwardly on a pair of roller pins and a pair of rollers to slide forward in a pair of tracks when the pair of rear struts press against the rear edge of the cargo bay and thereby retracting the rear wheel assembly.

8 Claims, 1 Drawing Sheet

U.S. Patent    Jun. 6, 2000    6,070,899
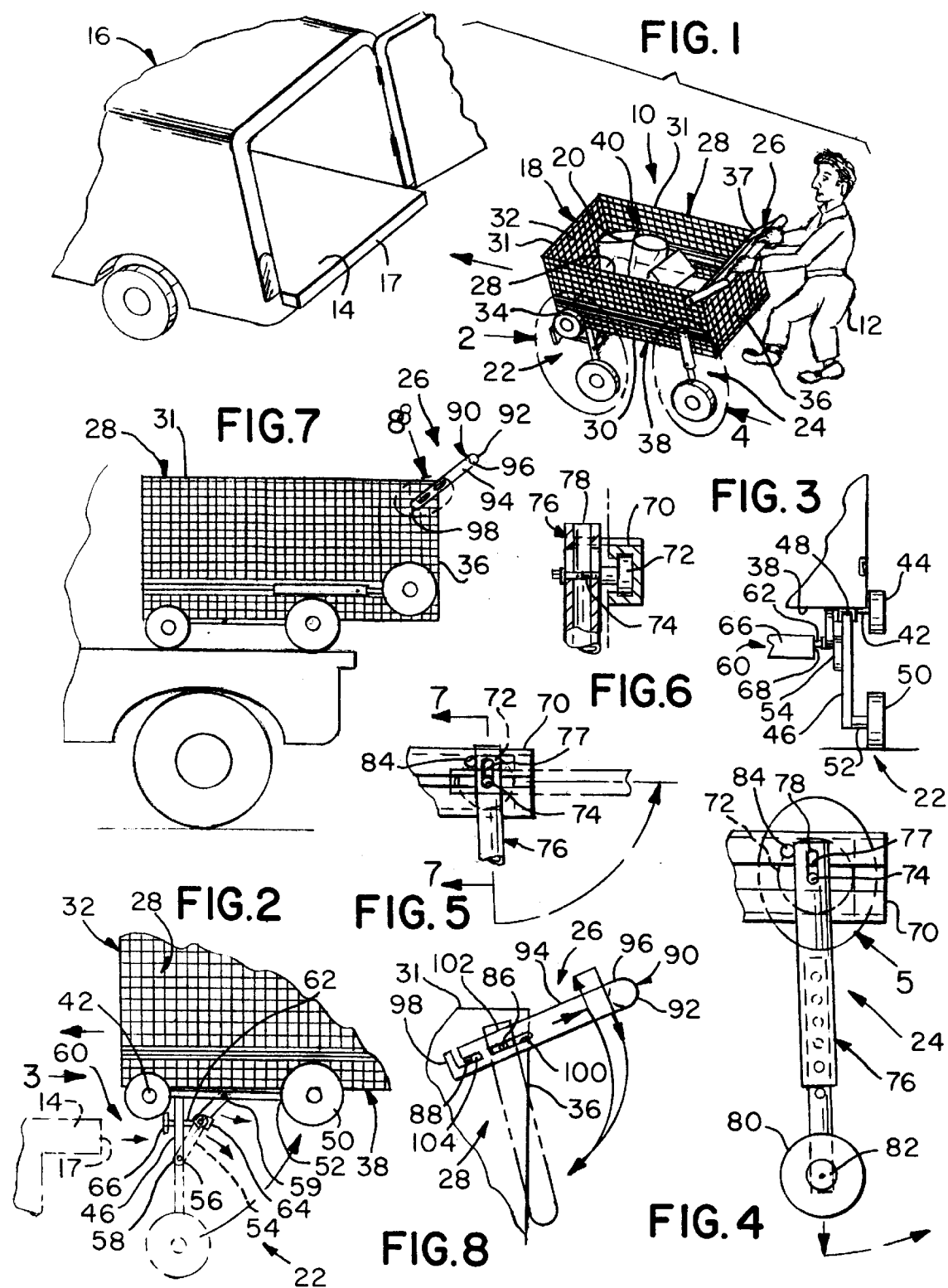

SELF-RETRACTING CART FOR USE IN THE CARGO BAY OF A SPORT UTILITY VEHICLE

BACKGROUND OF THE INVENTION

1. Field of the Invention

The present invention relates to a cart. More particularly, the present invention relates to a self-retracting cart for use in the cargo bay of a sport utility vehicle.

2. Description of the Prior Art

There is an ever increasing number of yearly sales of sport utility vehicles (SUV's) in the United States and world wide. Many people who own these vehicles must transfer groceries from the vehicle to their homes, which implies either hand carrying them or transferring them from the vehicle to a cart. People who live in condos usually have to carry them a greater distance, and the standard two wheeled collapsible cart is rarely large enough to accommodate an entire load of groceries.

Numerous innovations for carts have been provided in the prior art that will be described. Even though these innovations may be suitable for the specific individual purposes to which they address, however, they differ from the present invention.

For example, U.S. Pat. No. 4,275,896 to Eicher teaches a safety mechanism that is especially constructed for a carriage insertable into a load space of a vehicle. The safety device prevents the accidental unlocking of wheel supporting, tiltable arms of the carriage. Specifically, the wheel supporting arms must not be able to tilt upwardly unintentionally. For this purpose a security pin or bolt is provided which is capable of reaching behind a shoulder of a locking bolt. The security pin or bolt is connected by a cable to a tiltable lever which supports a roller. When the roller comes to rest on a support, for example, the loading platform, the security pin or bolt is withdrawn from the shoulder arresting position so that only after such withdrawal the locking bolt may be disengaged by actuating a respective grip member at the handle of the carriage.

Another example, U.S. Pat. No. 4,989,889 to Server Perez teaches a foldable cart for shopping having a rigid base for reinforcement of the bag bottom. Two frames carry the wheels on which the bag leans in the unfolded position during use. The frames allow the wheels to be folded beneath the rigid base. Bag supporting frameworks can be extended and folded by parallel sliding in order to allow extension for pulling the cart or folding to a bag of reduced size for hand transport. One of the frameworks is attached to the upper zone of the bag, pulling the latter for its extension or folding. The other framework has, close to an articulation axle at the rigid base of the bag, a piece provided with one or two lugs which pass through lots formed in the housing for articulation of the frameworks and the wheel frames and for automatic extension of the wheels.

Still another example, U.S. Pat. No. 5,649,718 to Groglio teaches a wheeled utility cart that includes a rigid rectangular brake component formed of molded plastic or a wire basket weave configuration. The wheels are relatively large to permit use of the cart on rough, soft, and/or uneven surfaces, unlike the conventional small diameter casters provided on shopping carts. The wheels support the cart at a convenient height and the front and rear wheels are independently and automatically retractable, to permit the cart to be inserted into the back of a motor vehicle, such as a van, station wagon, or sport utility vehicle having a back door or gate. Lockable brakes are also provided for at least the rear wheels, to prevent the cart from rolling on a slope. The brake operation is by means of a high mounted lever to preclude operation or disengagement by small children. A track is provided beneath the cart, which engages a mating track installed in the rear floor of the vehicle. The cart may thus be securely but removably anchored within the vehicles, for transport from store to home or other destinations as desired. Removable child seating and inner liner, as well as a cover which may be secured over the basket, are also provided for further utility. Thus, the cart may be loaded into the owner's vehicle transported to the store or other area, used by the owner for shopping, and loaded back into the vehicle for transport back home or to another destination as desired, by the retractable and extendible wheel mechanism.

Finally, yet another example, U.S. Pat. No. 5,687,984 to Samuel teaches a collapsing cart for wheeled transport of diverse items over the ground surface. The cart includes a pair of side members having handlebars for grasping by a user and a number of ground-engaging wheels for movement. A number of lateral struts join the side members together. A flexible article carrier is suspended from two of the lateral struts. In the event that the cart is to be used on unconsolidated or uneven surfaces, an auxiliary carriage having load-distributing rollers may be secured beneath the wheels.

It is apparent that numerous innovations for carts have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a self-retracting cart for use in the cargo bay of a sport utility vehicle that avoids the disadvantages of the prior art.

Another object of the present invention is to provide a self-retracting cart for use in the cargo bay of a sport utility vehicle that is simple and inexpensive to manufacture.

Still another object of the present invention is to provide a self-retracting cart for use in the cargo bay of a sport utility vehicle that is simple to use.

Briefly stated, yet another object of the present invention is to provide a self-retracting cart for use in the cargo bay of a sport utility vehicle. When a pair of front wheels are caused to roll on and into the cargo bay by the self-retracting cart for use in the cargo bay of a sport utility vehicle being pushed therein, a push plate is caused to press against the rear edge of the cargo bay and traverse rearwardly causing a pair of arms to traverse rearwardly and cause a pair of spreader brackets to fold which causes a pair of front struts to pivot upwardly against a bottom wall of the basket and retract a pair of intermediate wheels against the pair of side walls of the basket and out of the way and thereby retracting the front wheel assembly. When a pair of rear wheels leave the ground by the self-retracting cart for use in the cargo bay of a sport utility vehicle being further pushed into the cargo bay, a pair of rear struts drop and cause elongated slots to bottom out on a pair of roller pins which causes the uppermost ends of the pair of rear struts to clear a pair of limit pins, which allows the pair of rear struts to pivot upwardly on a pair of roller pins and a pair of rollers to slide forward in a pair of tracks when the pair of rear struts press against the rear edge of the cargo bay and thereby retracting the rear wheel assembly.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention approaching the cargo bay of a sport utility vehicle;

FIG. 2 is a diagrammatic side elevational view of the area generally enclosed by the dotted ellipse identified by arrow in FIG. 1;

FIG. 3 is a diagrammatic front elevational view taken generally in the direction of arrow 3 in FIG. 2;

FIG. 4 is an enlarged diagrammatic side elevational view of the area generally enclosed by the dotted ellipse identified by arrow 4 in FIG. 1;

FIG. 5 is a diagrammatic side elevational view of the area generally enclosed by the dotted ellipse identified by arrow 5 in FIG. 4;

FIG. 6 is a diagrammatic cross sectional view taken on line 6—6 in FIG. 5;

FIG. 7 is a diagrammatic side elevational view, in breakaway, of the present invention loaded in the cargo bay of the sport utility vehicle; and FIG. 8 is an enlarged diagrammatic side elevational view of the area generally enclosed by the dotted ellipse identified by arrow 8 in FIG. 7.

LIST OF REFERENCE NUMERALS UTILIZED IN THE DRAWING 10 self-retracting cart for use in the cargo bay of a sport utility vehicle of the present invention
12 user
14 cargo bay of sport utility vehicle 16
16 sport utility vehicle
17 rear edge of cargo bay 14 of sport utility vehicle 16
18 basket for holding items 20
20 items
22 front wheel assembly
24 rear wheel assembly
26 handle assembly
28 pair of side walls of basket 18
30 lowermost edges of pair of side walls 28 of basket 18
31 uppermost edges of pair of side walls 28 of basket 18
32 front end wall of basket 18
34 lowermost edge of front end wall 32 of basket 18
36 rear end wall of basket 18
37 uppermost edge of rear end wall 36 of basket 18
38 bottom wall of basket 18
40 open top of basket 18 for introduction of items 20
42 front axle of front wheel assembly 22
44 pair of front wheels of front wheel assembly 22
46 pair of front struts of front wheel assembly 22 for pivotal movement in a vertical plane and telescopically height adjustable, by nuts and bolts, for fitting varying heights of different model sport utility vehicle cargo bays
48 uppermost end of each front strut of pair of front struts 46 of front wheel assembly 22
50 pair of intermediate wheels of front wheel assembly 22
52 lowermost end of each front strut of pair of front struts 46 of front wheel assembly 22
54 pair of spreader brackets of front wheel assembly 22
56 one end of each spreader bracket of pair of spreader brackets 54 of front wheel assembly 22
58 intermediate position of each front strut of pair of front struts 46 of front wheel assembly 22
59 other end of each spreader bracket of pair of spreader brackets 54 of front wheel assembly 22
60 push plate assembly of front wheel assembly 22
62 pair of arms of push plate assembly 60 of front wheel assembly 22
64 rearmost end of each arm of pair of arms 62 of push plate assembly 60 of front wheel assembly 22
66 push plate of push plate assembly 60 of front wheel assembly 22
68 forwardmost end of each arm of pair of arms 62 of push plate assembly 60 of front wheel assembly 22
70 pair of tracks of rear wheel assembly 24
72 pair of rollers of rear wheel assembly 24
74 pair of roller pins of rear wheel assembly 24
76 pair of rear struts of rear wheel assembly 24 for pivotal and slidable movement in a vertical plane and which are telescopically height adjustable, by nuts and bolts, for fitting varying heights of different model sport utility vehicle cargo bays
77 elongated throughslot in each rear strut of pair of rear struts 76 of rear wheel assembly 24
78 uppermost end of each rear strut of pair of rear struts 76 of rear wheel assembly 24
80 pair of rear wheels of rear wheel assembly 24
82 lowermost end of each rear strut of pair of rear struts 76 of rear wheel assembly 24
84 pair of limit pins of rear wheel assembly 24
86 pair of pivot pins of handle assembly 26
88 pair of lock pins of handle assembly 26
90 handle of handle assembly 26
92 transverse portion of handle 90 of handle assembly 26
94 pair of leg portions of handle 90 of handle assembly 26
96 ends of transverse portion 92 of handle 90 of handle assembly 26
98 free end of each leg portion of pair of leg portions 94 of handle 90 of handle assembly 26
100 elongated throughslot extending axially along intermediate position 102 of each leg portion of pair of leg portions 94 of handle 90 of handle assembly 26
102 intermediate position of each leg portion of pair of leg portions 94 of handle 90 of handle assembly 26
104 L-shaped throughslot 104 extending through free end 98 of
each leg portion of pair of leg portions 94 of handle 90 of handle assembly 26

DETAILED DESCRIPTION OF THE PREFERRED EMBODIMENT

Referring now to the figures, in which like numerals indicate like parts, and particularly to FIG. 1, the self-retracting cart for use in the cargo bay of a sport utility vehicle of the present invention is shown generally at 10 being wheeled by a user 12 towards, and for loading into, the cargo bay 14 of a sport utility vehicle 16, wherein the cargo bay 14 of the sport utility vehicle 16 has a rear edge 17.

The overall configuration of the self-retracting cart for use in the cargo bay of a sport utility vehicle 10 can best be seen in FIG. 1, and as such will be discussed with reference thereto.

The self-retracting cart for use in the cargo bay of a sport utility vehicle 10 comprises a basket 18 for holding items 20, a front wheel assembly 22 that is operatively connected to the basket 18, a rear wheel assembly 24 that is operatively connected to the basket 18, and a handle assembly 26 that is operatively connected to the basket 18.

The specific configuration of the basket 18 can best be seen in FIG. 1, and as such will be discussed with reference thereto.

The basket 18 is generally rectangular-parallelepiped-shaped, and has a pair of side walls 28 with lowermost edges 30 and uppermost edges 31, a front end wall 32 with a lowermost edge 34, a rear end wall 36 with an uppermost edge 37, a bottom wall 38, and an open top 40 for introduction of the items 20.

The specific configuration of the front wheel assembly 22 can best be seen in FIGS. 2 and 3, and as such will be discussed with reference thereto.

The front wheel assembly 22 comprises a front axle 42 that is rotatively mounted laterally to the bottom wall 38 of the basket 18, in close proximity to the front end wall 32 of the basket 18.

The front wheel assembly 22 further comprises a pair of front wheels 44. Each front wheel of the pair of front wheels 44 of the front wheel assembly 22 is attached to a respective end of the front axle 42 of the front wheel assembly 22 for rotation therewith, and is disposed outboard of a respective side wall of the pair of side walls 28 of the basket 18.

The front wheel assembly 22 further comprises a pair of front struts 46 for pivotal movement in a vertical plane and which are telescopically height adjustable, by nuts and bolts, for fitting varying heights of different model sport utility vehicle cargo bays. Each front strut of the pair of front struts 46 of the front wheel assembly 22 is pivotally mounted at an uppermost end 48 to the bottom wall 38 of the basket 18, slightly behind and inboard of, the pair of front wheels 44 of the front wheel assembly 22.

The front wheel assembly 22 further comprises a pair of intermediate wheels 50. Each intermediate wheel of the pair of intermediate wheels 50 of the front wheel assembly 22 is rotatively mounted to a lowermost end 52 of a respective front strut of the pair of front struts 46 of the front wheel assembly 22.

The front wheel assembly 22 further comprises a pair of spreader brackets 54 for pivotal movement in a vertical plane. Each spreader bracket of the pair of spreader brackets 54 of the front wheel assembly 22 is pivotally mounted at one end 56 to a respective front strut of the pair of front struts 46 of the front wheel assembly 22, at an intermediate position 58 thereof, and is pivotally mounted at its other end 59 thereof to the bottom wall 38 of the basket 18, which allows the pair of intermediate wheels 50 of the front wheel assembly 22 to selectively pivot upwardly against the pair of side walls 28 of the basket 18, and be in line with the pair of front wheels 44 of the front wheel assembly 22 when the pair of intermediate wheels 50 of the front wheel assembly 22 is retracted.

The front wheel assembly 22 further comprises a push plate assembly 60. The push plate assembly 60 of the front wheel assembly 22 comprises a pair of arms 62 for axial movement. Each arm of the pair of arms 62 of the push plate assembly 60 of the front wheel assembly 22 is pivotally mounted at a rearmost end 64 thereof to a respective spreader of the pair of spreader brackets 54 of the front wheel assembly 22, and extends forwardly therefrom to slightly behind a respective front wheel of the pair of front wheels 44 of the front wheel assembly 22, while being disposed below the bottom wall 38 of the basket 18.

The push plate assembly 60 of the front wheel assembly 22 further comprises a push plate 66 that extends laterally from one arm of the pair of arms 62 of the push plate assembly 60 of the front wheel assembly 22 to the other arm of the pair of arms 62 of the push plate assembly 60 of the front wheel assembly 22, at their forwardmost ends 68, below the bottom wall 38 of the basket 18, and when the pair of front wheels 44 of the front wheel assembly 22 are caused to roll on and into the cargo bay 14 of the sport utility vehicle 16 when the self-retracting cart for use in the cargo bay of a sport utility vehicle 10 is pushed therein, the push plate 66 of the push plate assembly 60 of the front wheel assembly 22 is caused to press against the rear edge 14 of the cargo bay 17 of the sport utility vehicle 16 and traverse rearwardly which causes the pair of arms 62 of the push plate assembly 60 of the front wheel assembly 22 to also traverse rearwardly and cause the pair of spreader brackets 54 to fold which causes the pair of front struts 46 to pivot upwardly against the bottom wall 38 of the basket 18 and retract the pair of intermediate wheels 44 against the pair of side walls 28 of the basket 18 and out of the way and thereby retracting the front wheel assembly 22, with the pair of front wheels 44 of the front wheel assembly 22 keeping the self-retracting cart for use in the cargo bay of a sport utility vehicle 10 rolling forward as the pair of intermediate wheels 50 of the front wheel assembly 22 are retracting, and when the self-retracting cart for use in the cargo bay of a sport utility vehicle 10 is removed from the cargo bay 14 of the sport utility vehicle, the pair of intermediate wheels 50 extend by gravity and lock in place.

The specific configuration of the rear wheel assembly 24 can best be seen in FIGS. 4–6, and as such will be discussed with reference thereto.

The rear wheel assembly 24 comprises a pair of tracks 70. Each track of the pair of tracks 70 of the rear wheel assembly 24 extends axially along a respective side wall of the pair of side walls 28 of the basket 18, from the front end wall 32 of the basket 18 to the rear end wall 36 of the basket 18, parallel to the bottom wall 38 of the basket 18, and slightly above the pair of intermediate wheels 50 of the front wheel assembly 22 when they are retracted.

The rear wheel assembly 24 further comprises a pair of rollers 72. Each roller of the pair of rollers 72 of the rear wheel assembly 24 revolves axially in a respective track of the pair of tracks 70 of the rear wheel assembly 24.

The rear wheel assembly 24 further comprises a pair of roller pins 74. Each roller pin of the pair of roller pins 74 of the rear wheel assembly 24 extends laterally outwardly from a respective roller of the pair of rollers 72 of the rear wheel assembly 24 for rotation therewith, past the respective track of the pair of tracks of the rear wheel assembly 24.

The rear wheel assembly 24 further comprises a pair of rear struts 76 for pivotal and slidable movement in a vertical plane and which are telescopically height adjustable, by nuts and bolts, for fitting varying heights of different model sport utility vehicle cargo bays.

Each rear strut of the pair of rear struts 76 of the rear wheel assembly 24 is pivotally and slidably attached to, for selective movement in, a respective track of the pair of tracks 70 of the rear wheel assembly 24.

Each rear strut of the pair of rear struts 76 of the rear wheel assembly 24 has an elongated throughslot 77 that extends axially therealong, at an uppermost end 78 thereof.

The elongated throughslot 77 in a rear strut of the pair of rear struts 76 of the rear wheel assembly 24 pivotally and slidably receives a respective roller pin of the pair of roller pins 74 of the rear wheel assembly 24, outboard of a respective roller of the pair of rollers 72 of the rear wheel assembly 24.

The rear wheel assembly 24 further comprises a pair of rear wheels 80. Each rear wheel of the pair of rear wheels 80 of the rear wheel assembly 24 is rotatively mounted to a lowermost end 82 of a respective rear strut of the pair of rear struts 76 of the rear wheel assembly 24.

The rear wheel assembly 24 further comprises a pair of limit pins 84. Each limit pin of the pair of limit pins 84 of the rear wheel assembly 24 extends laterally outwardly from a respective track of the pair of tracks 70 of the rear wheel assembly 24, slightly above and forward of a respective roller pin of the pair of roller pins 74 of the rear wheel assembly 24 when the pair of struts 76 of the rear wheel assembly 24 are at their rearmost extremes and locked in their extended positions.

The pair of rear struts 76 of the rear wheel assembly 24 are locked downward by contact with a horizontal surface which causes the pair of roller pins 74 of the rear wheel assembly 24 to bottom out in the pair of elongated through slots 77 in the pair of rear struts 76 of the rear wheel assembly 24 and the pair of limit pins 84 of the rear wheel assembly 24 to contact the uppermost end 78 of each rear strut of the pair of rear struts 76 of the rear wheel assembly 24 and thereby preventing any pivoting of the pair of rear struts 76 of the rear wheel assembly 24, and when the pair of rear wheels 82 leave the horizontal surface by virtue of the pair of front wheels 44 of the front wheel assembly 22 continuing to roll into the cargo bay 14 of the sport utility vehicle 16, the pair of rear struts 76 of the rear wheel assembly 24 drop and cause the elongated slot 77 in each rear strut of the pair of rear struts 76 of the rear wheel assembly 24 to bottom out on the pair of roller pins 74 of the rear wheel assembly 24 which causes the uppermost end 78 of each rear strut of the pair of rear struts 76 of the rear wheel assembly 24 to clear the pair of limit pins 84 of the rear wheel assembly 24 which allows the pair of rear struts 76 of the rear wheel assembly 24 to pivot upwardly on the pair of roller pins 70 of the rear wheel assembly 24 and the pair of rollers 72 of the rear wheel assembly 24 to slide forward in the pair of tracks 70 of the rear wheel assembly 24 when the pair of rear struts 76 of the rear wheel assembly 24 press against the rear edge 17 of the cargo bay 14 of the sport utility vehicle 16 and thereby retracting the rear wheel assembly 24 and when the self-retracting cart for use in the cargo bay of a sport utility vehicle 10 is removed from the cargo bay 14 of the sport utility vehicle, the pair of rear wheels 82 of the rear wheel assembly are extended by gravity and locked in place.

The specific configuration of the handle assembly 26 can best be seen in FIGS. 7 and 8, and as such will be discussed with reference thereto.

The handle assembly 26 comprises a pair of pivot pins 86. Each pivot pin of the pair of pivot pins 86 of the handle assembly 26 extends laterally outwardly from a respective side wall of the pair of side walls 28 of the basket 18, in proximity to the uppermost edge 31 of the respective side wall of the pair of side walls 28 of the basket 18 and the rear wall 36 of the basket 18.

The handle assembly 26 further comprises a pair of lock pins 88. Each lock pin of the pair of lock pins 88 of the handle assembly 26 extends laterally outwardly from the respective side wall of the pair of side walls 28 of the basket 18, slightly forward and downward of, and parallel to, a respective pivot pin of the pair of pivot pins 86 of the handle assembly 26.

The handle assembly 26 further comprises a handle 90 for pivotal movement in a vertical plane. The handle 90 of the handle assembly 26 is substantially U-shaped and has a transverse portion 92 that extends laterally and parallel to the uppermost edge 37 of the rear wall 36 of the basket 18.

The handle 90 of the handle assembly 26 further has a pair of leg portions 94 for pivotal movement along the pair of side walls 28 of the basket 18, and which are parallel and depend from the transverse portion 92 of the handle 90 of the handle assembly 26, at its ends 96.

Each leg portion of the pair of leg portions 94 of the handle 90 of the handle assembly 26 terminates in a free end 98, and has an elongated throughslot 100 that extends axially along an intermediate position 102 thereof that pivotally and slidably receives a respective pivot pin of the pair of pivot pins 86 of the handle assembly 26.

Each leg portion of the pair of leg portions 94 of the handle 90 of the handle assembly 26 further has an L-shaped throughslot 104 that extends through the free end 98 thereof that selectively receives a respective lock pin of the pair of lock pins 88 of the handle assembly 26, and when the self-retracting cart for use in the cargo bay of a sport utility vehicle 10 has rolled completely into the cargo bay 14 of the sport utility vehicle 16, the handle 90 of the handle assembly 26 is pulled causing the pair of pivot pins 86 of the handle assembly 26 to slide and bottom out in the elongated throughslot 100 in each leg portion of the pair of leg portions 94 of the handle 90 of the handle assembly 26 and the pair of lock pins 88 to bottom out in the L-shaped throughslot 104 in each leg portion of the pair of leg portions 94 of the handle 90 of the handle assembly 26 allowing the handle 90 of the handle assembly 26 to pivot downwardly, and when the handle 90 of the handle portion 26 is pivoted downwardly, the pair of lock pins 88 escape from the L-shaped throughslot 104 in each leg portion of the pair of leg portions 94 of the handle 90 of the handle assembly 26 causing the transverse portion 92 of the handle 90 of the handle assembly 26 to abut against the rear wall 36 of the basket 18, and when the self-retracting cart for use in the cargo bay of a sport utility vehicle 10 has rolled completely out of the cargo bay 14 of the sport utility vehicle 16, the transverse portion 92 of the handle 90 of the handle assembly 26 is pivoted upwardly, with the L-shaped throughslot 104 in each leg portion of the pair of leg portions 94 of the handle 90 of the handle assembly 26 receiving the pair of lock pins 88 of the handle assembly 26, and the handle 90 of the handle assembly 26 then being pushed causing the pair of lock pins 88 of the handle assembly 26 to be captured in the L-shaped throughslot 104 in each leg portion of the pair of leg portions 94 of the handle 90 of the handle assembly 26, and lock the handle assembly 26.

It will be understood that each of the elements described above, or two or more together, may also find a useful application in other types of constructions differing from the types described above.

While the invention has been illustrated and described as embodied in a self-retracting cart for use in the cargo bay of a sport utility vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A self-retracting cart for use in the cargo bay of a sport utility vehicle wherein the cargo bay of the sport utility vehicle has a rear edge, said cart comprising:
 a) a basket for holding items; said basket being generally rectangular-parallelepiped-shaped, and having:
  i) a pair of side walls with lowermost edges and uppermost edges;
  ii) a front end wall with a lowermost edge;
  iii) a rear end wall with an uppermost edge;
  iv) a bottom wall; and
  v) an open top for introduction of the items;
 b) a front wheel assembly operatively connected to said basket; said front wheel assembly comprising:
  i) a front axle being rotatively mounted laterally to said bottom wall of said basket, in close proximity to said front end wall of said basket;
  ii) a pair of front wheels; each front wheel of said pair of front wheels of said front wheel assembly being attached to a respective end of said front axle of said front wheel assembly for rotation therewith, and being disposed outboard of a respective side wall of said pair of side walls of said basket;
  iii) a pair of front struts for pivotal movement in a vertical plane, and being telescopically height adjustable, by nuts and bolts, for fitting varying heights of different model sport utility vehicle cargo bays; each front strut of said pair of front struts of said front wheel assembly being pivotally mounted at an uppermost end to said bottom wall of said basket, slightly behind and inboard of, said pair of front wheels of said front wheel assembly;
  iv) a pair of intermediate wheels; each intermediate wheel of said pair of intermediate wheels of said front wheel assembly being rotatively mounted to a lowermost end of a respective front strut of said pair of front struts of said front wheel assembly;
  v) a pair of spreader brackets for pivotal movement in a vertical plane; each spreader bracket of said pair of spreader brackets of said front wheel assembly being pivotally mounted at one end to a respective front strut of said pair of front struts of said front wheel assembly, at an intermediate position thereof, and being pivotally mounted at its other end thereof to said bottom wall of said basket, which allows said pair of intermediate wheels of said front wheel assembly to selectively pivot upwardly against said pair of side walls of said basket and be in line with said pair of front wheels of said front wheel assembly when said pair of intermediate wheels of said front wheel assembly are retracted; and
  vi) a push plate assembly; said push plate assembly of said front wheel assembly comprising:
   1) a pair of arms for axial movement; each arm of said pair of arms of said push plate assembly of said front wheel assembly being pivotally mounted at a rearmost end thereof to a respective spreader of said pair of spreader brackets of said front wheel assembly, and extending forwardly therefrom to slightly behind a respective front wheel of said pair of front wheels of said front wheel assembly, while being disposed below said bottom wall of said basket; and
   2) a push plate extending laterally from one arm of said pair of arms of said push plate assembly of said front wheel assembly to the other arm of said pair of arms of said push plate assembly of said front wheel assembly, at their forwardmost ends, and being disposed below said bottom wall of said basket, and when said pair of front wheels of said front wheel assembly are caused to roll on and into the cargo bay of the sport utility vehicle when said self-retracting cart for use in said cargo bay of a sport utility vehicle is pushed therein, said push plate of said push plate assembly of said front wheel assembly is caused to press against the rear edge of the cargo bay of the sport utility vehicle and traverse rearwardly causing said pair of arms of said push plate assembly of said front wheel assembly to also traverse rearwardly and cause said pair of spreader brackets to fold which causes said pair of front struts to pivot inwardly against said bottom wall of said basket and retract said pair of intermediate wheels against said pair of side walls of said basket and out of the way and thereby retract said front wheel assembly, with said pair of front wheels of said front wheel assembly keeping said self-retracting cart for use in said cargo bay of a sport utility vehicle rolling forward as said pair of intermediate wheels of said front wheel assembly are retracting, and when said self-retracting cart for use in said cargo bay of a sport utility vehicle is removed from the cargo bay of the sport utility vehicle, said pair of intermediate wheels extend by gravity and lock in place;
 c) a rear wheel assembly operatively connected to said basket; said rear wheel assembly comprising:
  i) a pair of tracks; each track of said pair of tracks of said rear wheel assembly extending axially along a respective side wall of said pair of side walls of said basket, from said front end wall of said basket to said rear end wall of said basket, parallel to said bottom wall of said basket, and slightly above said pair of intermediate wheels of said front wheel assembly when they are retracted;
  ii) a pair of rollers; each roller of said pair of rollers of said rear wheel assembly revolving axially in a respective track of said pair of tracks of raid rear assembly;
  iii) a pair of roller pins; each roller pin of said pair of roller pins of said rear wheel assembly extending laterally outwardly from a respective roller of said pair of rollers of said rear wheel assembly for rotation therewith, past said respective track of said pair of tracks of said rear wheel assembly;
  iv) a pair of rear struts for pivotal and slidable movement in a vertical plane, and being telescopically height adjustable, by nuts and bolts, for fitting varying heights of different model sport utility vehicle cargo bays; each rear strut of said pair of rear struts of said rear wheel assembly being pivotally and slidably attached to, for selective movement in, a respective track of said pair of tracks of said rear wheel assembly; each rear strut of said pair of rear struts of said rear wheel assembly having an elongated throughslot extending axially therealong, at an uppermost end thereof; said elongated throughslot in each rear strut of said pair of rear struts of said rear wheel assembly pivotally and slidably receiving a respective roller pin of said pair of roller pins of said rear wheel assembly, outboard of a respective roller of said pair of rollers of said rear wheel assembly; and v) a pair of limit pins; each limit pin of said pair of limit pins of said rear wheel assembly extending laterally outwardly from a respective track of said pair of tracks of said rear wheel assembly, slightly above and forward of a respective roller pin of said pair of roller pins of said rear wheel assembly when said pair of struts of said rear wheel assembly are at their rearmost extremes and locked in their extended positions, with said pair of rear struts of said rear wheel assembly being locked downward by contact with a horizontal surface which causes said pair of roller pins of said rear wheel assembly to bottom out in said pair of elongated throughslots in said pair of rear struts of said rear wheel assembly and said pair of limit pins of said rear wheel assembly to contact said uppermost end of each rear strut of said pair of rear struts of said rear wheel assembly and thereby prevent any pivoting of said pair of rear struts of said rear wheel assembly, and when said pair of rear wheels leave the horizontal surface by virtue of said pair of front wheels of said front wheel assembly rolling into the cargo bay of the sport utility vehicle, said pair of rear struts of said rear wheel assembly drop and cause said elongated slot in each rear strut of said pair of rear struts of said rear wheel assembly to bottom out on said pair of roller pins of said rear wheel assembly which causes said uppermost end of each rear strut of said pair of rear struts of said rear wheel assembly to clear said pair of limit pins of said rear wheel assembly which allows said pair of rear struts of said rear wheel assembly to pivot upwardly on said pair of roller pins of said rear wheel assembly and said pair of rollers of said rear wheel assembly to slide forward in said pair of tracks of said rear wheel assembly when said pair of rear struts of said rear wheel assembly press against the rear edge of the cargo bay of the sport utility vehicle and thereby retracting said rear wheel assembly, and when said self-retracting cart for use in said cargo bay of a sport utility vehicle is removed from the cargo bay of the sport utility vehicle, said pair of rear wheels of said rear wheel assembly are extended by gravity and locked in place; and d) a handle assembly operatively connected to said basket.

2. The cart as defined in claim 1, wherein said rear wheel assembly further comprises a pair of rear wheels; each rear wheel of said pair of rear wheels of said rear wheel assembly is rotatively mounted to a lowermost end of a respective rear strut of said pair of rear struts of said rear wheel assembly.

3. The cart as defined in claim 1, wherein said handle assembly comprises a pair of pivot pins; each pivot pin of said pair of pivot pins of said handle assembly extends laterally outwardly from a respective side wall of said pair of side walls of said basket, in proximity to said uppermost edge of said respective side wall of said pair of side walls of said basket and said rear wall of said basket.

4. The cart as defined in claim 3, wherein said handle assembly further comprises a pair of lock pins; each lock pin of said pair of lock pins of said handle assembly extends laterally outwardly from said respective side wall of said pair of side walls of said basket, slightly forward and downward of, and parallel to, a respective pivot pin of said pair of pivot pins of said handle assembly.

5. The cart as defined in claim 4, wherein said handle assembly further comprises a handle for pivotal movement in a vertical plane; said handle of said handle assembly is substantially U-shaped and has a transverse portion that extends laterally and parallel to said uppermost edge of said rear wall of said basket.

6. The cart as defined in claims 5, wherein said handle of said handle assembly further has a pair of leg portions for pivotal movement along said pair of side walls of said basket, and which are parallel and depend from said transverse portion of said handle of said handle assembly, at its ends.

7. The cart as defined in claim 6, wherein each leg portion of said pair of leg portions of said handle of said handle assembly terminates in a free end, and has an elongated throughslot that extends axially along an intermediate position thereof that pivotally and slidably receives a respective pivot pin of said pair of pivot pins of said handle assembly.

8. The cart as defined in claim 7, wherein each leg portion of said pair of leg portions of said handle of said handle assembly further has an L-shaped throughslot that extends through said free end thereof that selectively receives a respective lock pin of said pair of lock pins of said handle assembly, and when said self-retracting cart for use in the cargo bay of a sport utility vehicle has rolled completely into the cargo bay of the sport utility vehicle, said handle of said handle assembly is pulled causing said pair of pivot pins of said handle assembly to slide and bottom out in said elongated throughslot in each leg portion of said pair of leg portions of said handle of said handle assembly and said pair of lock pins to bottom out in said L-shaped throughslot in each leg portion of said pair of leg portions of said handle of said handle assembly which allows said handle of said handle assembly to pivot downwardly, and when said handle of said handle portion is pivoted downwardly, said pair of lock pins of said handle assembly escape from said L-shaped throughslot in each leg portion of said pair of leg portions of said handle of said handle assembly causing said transverse portion of said handle of said handle assembly to abut against said rear wall of said basket, and when said self-retracting cart for use in the cargo bay of a sport utility vehicle has rolled completely out of the cargo bay of the sport utility vehicle, said transverse portion of said handle of said handle assembly is pivoted upwardly, with said L-shaped throughslot in each leg portion of said pair of leg portions of said handle of said handle assembly receiving said pair of lock pins of said handle assembly, and said handle of said handle assembly then being pushed causing said pair of lock pins of said handle assembly to be captured in said L-shaped throughslot in each leg portion of said pair of leg portions of said handle of said handle assembly and lock said handle assembly.

* * * * *